United States Patent Office 2,823,208
Patented Feb. 11, 1958

2,823,208

PRODUCTION OF 2-ACYLAMINO-5-MERCAPTO-THIADIAZOLE

John Song, North Plainfield, N. J., assignor to American Cyanamid Company, New York, N. Y., a corporation of Maine No Drawing. Application October 27, 1955
Serial No. 543,279

9 Claims. (Cl. 260—306.8)

This invention relates to a process of preparing an acylamino-1,3,4-thiadiazole by reaction of corresponding amino-thiadiazoles with an aliphatic acid in the presence of polyphosphoric acid.

Various thiadiazoles and their derivatives are useful for the treatment of diseases, particularly 2-acetylamino-1,3,4-thiadiazole-5-sulfonamide which is useful as a diuretic and for the treatment of epilepsy and glaucoma.

In the past it has been customary to acylate amino-thiadiazoles by the reaction of an acid anhydride and the amino-thiadiazole, or by the reaction of an acid chloride and an amino-thiadiazole. Acylation using the acid directly has been completely impractical.

Acid anhydrides and acid chlorides are in general expensive and may be difficult to prepare. Also, acid binding agents are necessary to take up the hydrogen halide which is formed from the reaction with an acid chloride. When an acid anhydride is used, at least half of the acid is released as a free acid under such conditions that recovery is usually completely impractical, and usually a large excess is necessary. The acid which is not used may cause difficulties in disposal. For example, in the production of the butyric amides, butyric acid is released in the waste products and butyric acid causes difficulties in disposal plants because of its objectionable odor and its extremely high biochemical oxygen demand.

I have now found that the acylation of amino-thiadiazoles may be conveniently and rapidly accomplished by direct reaction with an aliphatic acid in the presence of polyphosphoric acid, preferably at elevated temperatures. The method is particularly convenient in the preparation of 2-acylamino-5-mercapto-1,3,4-thiadiazoles, although the acylation may be accomplished before or after conversion of the mercapto group to other groups, and obviously a wide variety of acyl groups may be introduced although the acetyl group is at present meeting with the biggest commercial demand, and accordingly is used for purposes of illustration. The ease of reaction is particularly surprisihng, and it is also surprising that in compounds such as 2-amino-5-mercapto-1,3,4-thiadiazole where two groups are susceptible to acylation, the use of polyphosphoric acid promotes the acylation of the amino group without causing an appreciable acylation of the mercapto group. Better yields may be obtained than by the use of the acid anhydrides or acid chlorides.

It is preferred that at least a stoichiometric quantity of the aliphatic acid be used although sometimes an excess by the law of mass action aids in shifting the equilibrium point in favor of a more complete reaction and an excess of the acid may give higher yields of the acylamino-thiadiazole. Usually over 3 mols of the acid becomes uneconomical although theoretically more may be used. From about one-fourth part to two parts of polyphosphoric acid per part by weight of the initial amino-thiadiazole gives excellent results although more may be used. Usually about three-fourths parts to one and a half of polyphosphoric acid per part of the amino-thiadiazole gives the most economical results, although this exact ratio will change with changes in price structures of the ingredients. These ratios are convenient for mechanical stirring and handling as it is desired that a stirrable mixture result at a temperature of not in excess of 100° C. The temperature for the reaction is conveniently within the range of about 100° C. to 200° C. Lower temperatures are effective but increase the time of reaction beyond the preferred operating range. With too high a temperature, the acids may volatilize. Reflux conditions are usually preferred.

Among the acids which may be conveniently introduced by this process are acetic, propionic, butyric, valeric, maleic, isovaleric and the other aliphatic acids. The polyphosphorus acid used is conveniently the product obtained as an article of commerce under this designation. Usually in commercial practice polyphosphoric acid has a $P_2O_5$ content of from 82 to 84%. An acid with a $P_2O_5$ content of from 80 to 89% is conveniently used although ratios outside of the range of 82 to 84% must usually be especially prepared.

In the following examples illustrating this invention, the proportions are by weight unless otherwise designated.

EXAMPLE 1

2-acetylamino-5-mercapto-1,3,4-thiadiazole

To a mixture of 105 parts of acetic acid and 50 parts of commercial polyphosphoric acid, heated to a temperature of about 100° C. is added 66.5 parts of 2-amino-5-mercapto-1,3,4-thiadiazole. The whole mixture is heated with stirring between 115° C. and 122° C. until the reaction is substantially complete. The mixture is then drowned in 350 parts of water and the crystalline product which forms is removed by filtration, washed with water, and dried. 85.3 grams of a good quality product results.

EXAMPLE 2

2-propionylamino-5-mercapto-1,3,4-thiadiazole

To a mixture of 148 parts of propionic acid and 72.5 parts of commercial polyphosphoric acid at 105° C. which has been refluxed for 12 minutes is added 66.5 parts of 2 - amino-5-mercapto-1,3,4-thiadiazole. The whole mixture is heated at 115° C. to 123° C. until the reaction is substantially complete. The reaction mixture is drowned in 300 parts of water and after cooling to room temperature the precipitated product is cooled, washed with water, and dried. 90.1 grams of 2-propionylamino-5-mercapto-1,3,4-thiadiazole of high purity results.

EXAMPLE 3

2-isobutyrylamino-5-mercapto-1,3,4-thiadiazole

To a mixture of 100 parts of isobutyric acid and 85 parts of commercial polyphosphoric acid at 105° C. is added 66.5 parts of 2-amino-5-mercapto-1,3,4-thiadiazole. The reaction mixture is heated to a temperature of 135° C. to 145° C. until the reaction is substantially complete. The mixture is drowned in 300 parts of water and after cooling to room temperature, the product is collected, washed with water, and dried. 98.8 grams of 2-isobutyrylamino-5-mercapto-1,3,4-thiadiazole of high purity results.

EXAMPLE 4

2-isovalerylamino-5-mercapto-1,3,4-thiazole

To a mixture of 125 parts of isovaleric acid and 83 parts of commercial polyphosphoric acid at a temperature of 125° C. is added 66.5 parts of 2-amino-5-mercapto-1,3,4-thiadiazole. The reaction mixture is then heated at a temperature range of 139° C. to 146° C. until the reaction is substantially complete. The mixture is drowned in 350 parts of water, cooled to room temperature, and the precipitated product is removed by filtration, and washed with water. It is purified by dissolving in an aqueous solution of ammonia and reprecipitating with hydrochloric acid. 91 grams of 2-isovaleryl-amino-5-mercapto-1,3,4-thiadiazole of high purity is recovered.

EXAMPLE 5

*2-butyrylamino-5-mercapto-1,3,4-thiadiazole*

1800 grams of commercial polyphosphoric acid and 2808 milliliters of butyric acid are mixed in a 12 liter round bottom flask, heated to 145° C. for 15 minutes, cooled to 135° C.; and thereto is added 1500 grams of 2-amino-5-mercapto-1,3,4-thiadiazole with stirring. The mixture is heated between 135° C. and 140° C. for one hour, and the reaction mixture drowned in 10 liters of water. The slurry is cooled to 20° C., filtered, washed with water, and the product dried. A yield of 2212 grams of 2-butyrylamino-5-mercapto-1,3,4-thiadiazole is obtained. This represents a yield of 96.6%.

EXAMPLE 6

*2-butyrylamino-5-mercapto-1,3,4-thiadiazole from butyric anhydride*

48.5 grams of butyric anhydride are heated to 85° C. and thereto is added 15 grams of 2-amino-5-mercapto-1,3,4-thiadiazole. The mixture is heated between 135° C. and 140° C. for half an hour, cooled to 110° C., and 5 milliliters of water is added to decompose the surplus of butyric anhydride. After stirring an additional 5 milliliters of water is added, and the reaction mixture permitted to cool. When the product starts to separate an additional 100 milliliters of water is added, the mixture is cooled to 20° C., filtered and washed. The product is dried. There is obtained 19.6 grams of 2-butyryl-amino-5-mercapto-1,3,4-thiadiazole which represents a yield of 85.5%.

I claim:

1. A process for preparing acylamino-thiadiazoles which comprises heating an amino-thiadiazole with at least about an aquivalent of an aliphatic acid in the presence of at least about 0.25 part by weight of polyphosphoric acid per part of amino-thiadiazole.

2. A process for preparing 2-acylamino-5-mercapto-1,3,4-thiadiazoles which comprises heating 2-amino-5-mercapto-1,3,4-thiadiazole with at least about an equivalent of an aliphatic acid in the presence of at least about 0.25 part by weight of polyphosphoric acid per part of 2-amino-5-mercapto-1,3,4-thiadiazole.

3. The process of claim 2 in which the acid is acetic acid.

4. The process of claim 2 in which the acid is propionic acid.

5. The process of claim 2 in which the acid is iso-butyric acid.

6. The process of claim 2 in which the acid is isovaleric acid.

7. The process of claim 2 in which the acid is butyric acid.

8. A process for preparing 2-acylamino-5-mercapto-1,3,4-thiadiazole which comprises heating 2-amino-5-mercapto-1,3,4-thiadiazole with at least about one equivalent of an aliphatic acid in the presence of from 0.75 to 1.5 parts of polyphosphoric acid per part by weight of 2-amino-5-mercapto-1,3,4-thiadiazole.

9. The process of claim 8 in which the aliphatic acid is propionic acid.

References Cited in the file of this patent

FOREIGN PATENTS 633,724     Great Britain _____ Dec. 19, 1949

OTHER REFERENCES

Hartough et al.: J. Am. Chem. Soc., vol. 69, pp. 3098–9 (1947).

Ohta et al.: Chem. Abstracts, vol. 47, col. 9323 (1953).

Snyder et al.: J. Am. Chem. Soc., vol. 72, pp. 2962–5 (1950).

Snyder et al.: J. Am. Chem. Soc., vol. 74, pp. 5820–2 (1952).

U. S. DEPARTMENT OF COMMERCE
PATENT OFFICE
CERTIFICATE OF CORRECTION

Patent No. 2,823,208                          February 11, 1958

John Song

It is hereby certified that error appears in the printed specification of the above numbered patent requiring correction and that the said Letters Patent should read as corrected below.

Column 1, line 54, for "surprisihng" read -- surprising --; column 2, line 37, for "qood" read -- good --; line 67, for "thiazole" read -- thiadiazole --.

Signed and sealed this 8th day of April 1958.

(SEAL)
Attest:
KARL H. AXLINE
Attesting Officer

ROBERT C. WATSON
Commissioner of Patents